(12) United States Patent
Wang et al.

(10) Patent No.: US 8,316,460 B1
(45) Date of Patent: Nov. 20, 2012

(54) PRIVATE WEB BROWSING USING ENCRYPTION

(75) Inventors: Meng Wang, San Francisco, CA (US); Arnaud Claude Weber, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/315,252

(22) Filed: Dec. 8, 2011

Related U.S. Application Data

(60) Provisional application No. 61/563,011, filed on Nov. 22, 2011.

(51) Int. Cl.
*G06F 12/14* (2006.01)

(52) U.S. Cl. ............... 726/30; 726/27; 726/28; 713/165; 713/193

(58) Field of Classification Search .................. 726/30
See application file for complete search history.

(56) References Cited

U.S. PATENT DOCUMENTS

| | | | |
|---|---|---|---|
| 6,601,169 B2* | 7/2003 | Wallace et al. | 713/151 |
| 6,944,651 B2* | 9/2005 | Onyon et al. | 709/217 |
| 7,299,500 B1* | 11/2007 | Klebe et al. | 726/26 |
| 7,979,909 B2* | 7/2011 | Jancula et al. | 726/26 |
| 8,095,967 B2* | 1/2012 | Loesch et al. | 726/5 |
| 2002/0152378 A1* | 10/2002 | Wallace et al. | 713/168 |
| 2008/0052641 A1* | 2/2008 | Brown et al. | 715/811 |
| 2009/0144546 A1* | 6/2009 | Jancula et al. | 713/168 |
| 2009/0158035 A1* | 6/2009 | Stultz | 713/160 |
| 2010/0017616 A1* | 1/2010 | Nichols et al. | 713/183 |
| 2010/0131441 A1* | 5/2010 | Gruenhagen et al. | 706/45 |
| 2011/0167492 A1* | 7/2011 | Ghosh et al. | 726/23 |
| 2011/0238992 A1* | 9/2011 | Jancula et al. | 713/168 |
| 2011/0282742 A1* | 11/2011 | Umeda | 705/14.54 |

OTHER PUBLICATIONS

P. Smulikowski, "First Look at the Windows 7 Forensics," 2009, University of Strathclyde, pp. 11-52.*
Spiekermann et al., "Engineering Privacy," 2009, IEEE, pp. 67-82.*
Balleste et al., "Privacy in the Information and Communication Technologies," 2007, IEEE, pp. 775-780.*
Mohania et al., "Secured Web Access," 2001, IEEE, pp. 182-189.*
Ohta et al., "Design and Implementation of Privacy-Enhanced Operation History Middleware for Smartphones," 2011, IEEE, pp. 336-341.*
Aggarwal et al., "An Analysis of Private Browsing Modes in Modern Browsers", retrieved from <http://crypto.stanford.edu/~dabo/pubs/papers/privatebrowsing.pdf>, Dec. 6, 2011.

* cited by examiner

*Primary Examiner* — Luu Pham
(74) *Attorney, Agent, or Firm* — McDermott Will & Emery LLP

(57) ABSTRACT

Computer-implemented methods for temporarily storing history of a private web browsing session using encryption are provided. In one aspect, a method includes receiving a request to temporarily store viewing session information for a web browsing session, and receiving a request to view a web page during the web browsing session. The method also includes generating an encryption key for the viewing session information for the web page during the web browsing session, encrypting the viewing session information for the web page using the encryption key, and storing the encrypted viewing session information in non-volatile memory and the encryption key in volatile memory. Access to the encrypted viewing session information is controlled by the encryption key in volatile memory. Systems, graphical user interfaces, and machine-readable media are also provided.

17 Claims, 6 Drawing Sheets

PRIVATE WEB BROWSING USING ENCRYPTION

CROSS-REFERENCE TO RELATED APPLICATIONS

The present application claims the benefit of priority under 35 U.S.C. § 119 from U.S. Provisional Patent Application Ser. No. 61/563,011, entitled "Private Web Browsing Using Encryption," filed on Nov. 22, 2011, the disclosure of which is hereby incorporated by reference in its entirety for all purposes.

BACKGROUND

1. Field

The present disclosure generally relates to the transmission of data over a network, and more particularly to the use of a computing device to communicate over a network.

2. Description of the Related Art

Browsers on mobile devices typically store the history of user browsing sessions in memory. A user that does not desire to leave a record of a web browsing session must actively trigger the history of the web browsing session to be deleted. If the user forgets to trigger the deletion, the history can be retrieved from memory by another user. In certain circumstances, even after deletion, traces of the web browsing session can be retrieved from memory.

SUMMARY

According to one embodiment of the present disclosure, a computer-implemented method for temporarily storing history of a private web browsing session using encryption is provided. The method includes receiving a request to temporarily store viewing session information for a web browsing session, and receiving a request to view a web page during the web browsing session. The method also includes generating an encryption key for the viewing session information for the web page during the web browsing session, encrypting the viewing session information for the web page using the encryption key, and storing the encrypted viewing session information in non-volatile memory and the encryption key in volatile memory. Access to the encrypted viewing session information is controlled by the encryption key in volatile memory.

According to another embodiment of the present disclosure, a system for temporarily storing history of a private web browsing session using encryption is provided. The system includes a volatile memory includes an encryption key, and a processor. The processor is configured to receive a request to temporarily store viewing session information for a web browsing session, receive a request to view a web page during the web browsing session, and generate an encryption key for the viewing session information for the web page during the web browsing session in response to the request to temporarily store viewing session information. The processor is also configured to encrypt the viewing session information for the web page using the encryption key, and store the encrypted viewing session information in non-volatile memory and the encryption key in volatile memory. Access to the encrypted viewing session information is controlled by the encryption key in volatile memory.

According to a further embodiment of the present disclosure, a web browser for temporarily storing history of a private web browsing session using encryption is provided. The web browser includes a settings interface configured to receive a request to temporarily store viewing session information for a web browsing session, and a web browsing interface configured to receive a request to view the web page during the web browsing session. The viewing session information for the web page is encrypted using an encryption key generated for the encrypted viewing session information, the encrypted viewing session information is stored in non-volatile memory and the encryption key in volatile memory, and access to the encrypted viewing session information is controlled by the encryption key.

According to yet a further embodiment of the present disclosure, a machine-readable storage medium includes machine-readable instructions for causing a processor to execute a method for temporarily storing history of a private web browsing session using encryption is provided. The method includes receiving a request from a user to temporarily store viewing session information for a web browsing session, receiving a request to view a web page during the web browsing session, and generating an encryption key for the viewing session information for the web page during the web browsing session in response to the request to temporarily store viewing session information. The method also includes encrypting the viewing session information for the web page using the encryption key, and storing the encrypted viewing session information in non-volatile memory and the encryption key in volatile memory. Access to the encrypted viewing session information is controlled by the encryption key in volatile memory.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed mobile web browser stores traces of a private (or "incognito") mobile web browsing session in an encrypted file in non-volatile memory, and retains the key to decrypting the file in volatile memory. The key in volatile memory is not accessible to other processes in memory (either volatile or non-volatile) other than the mobile web browser. By temporarily storing encrypted private mobile web browsing sessions (or "incognito tabs") in non-volatile memory, many incognito tabs can be retrieved and made accessible to the user using their respective keys. Once a user closes a mobile browser session, the corresponding encrypted file and key are erased. If the mobile browser session ends unexpectedly (e.g., it stops performing as expected), the corresponding key in volatile memory will be automatically be lost (as a function of it being in volatile memory) and the corresponding encrypted file will remain inaccessible. The encrypted file, which can be stored in a designated area in the non-volatile memory, can be deleted at a later time using a scheduled process for deleting files in the designated area.

Although many examples provided herein describe a user's information (e.g., web browsing information) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 1:
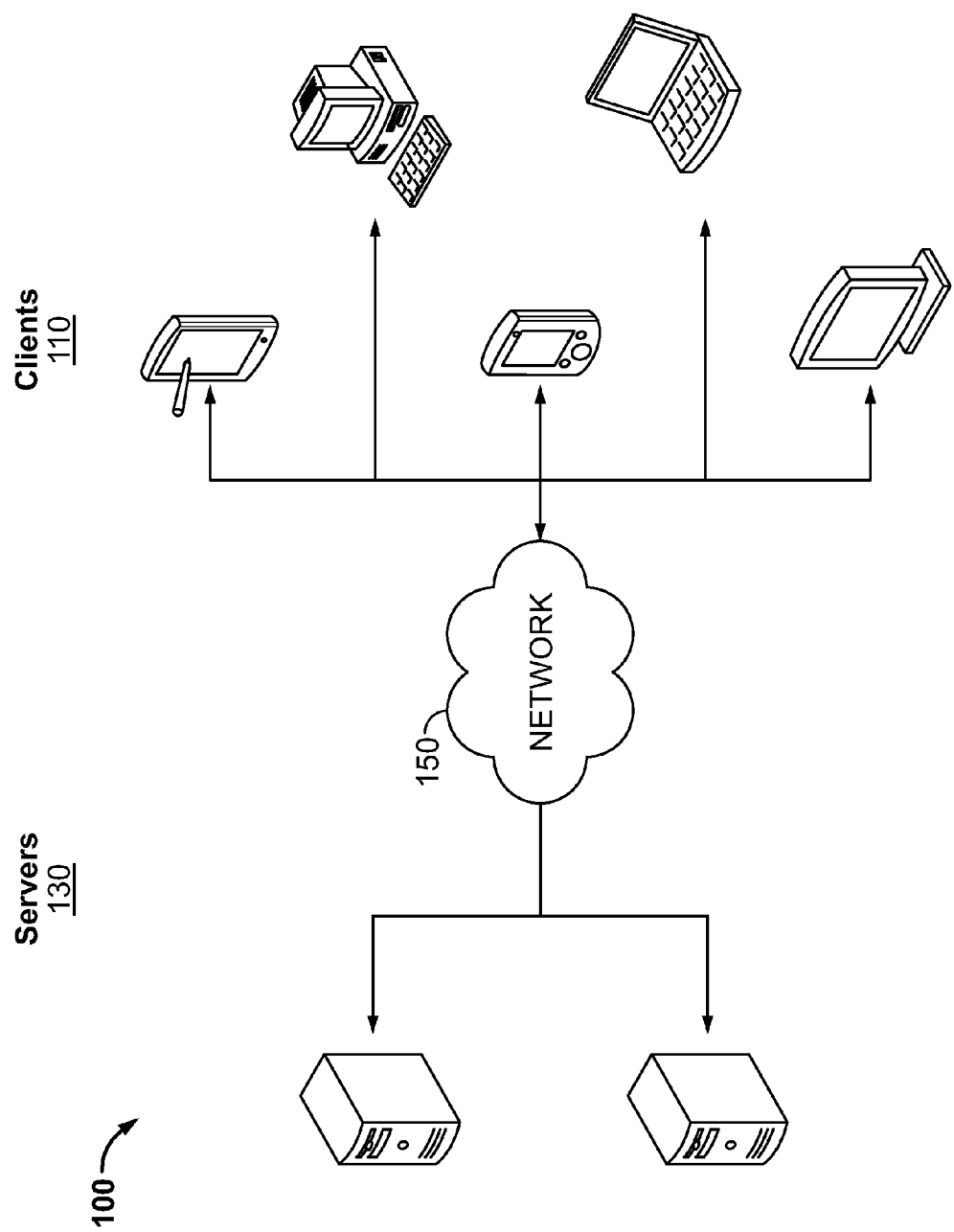
FIG. 1 illustrates an exemplary architecture for temporarily storing history of a private web browsing session using encryption.

FIG. 1 illustrates an exemplary architecture 100 for temporarily storing history of a private web browsing session using encryption. The architecture 100 includes servers 130 and clients 110 connected over a network 150.

Each of the clients 130 is configured to download, install, and run a web browser as disclosed herein. The web browser is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, projectors, or any other devices having appropriate processor, memory, and communications capabilities.

The web browser can be downloaded over the network 150 from one of the many servers 130. For purposes of load balancing, multiple servers 130 can also host the data for downloading the web browser. In certain instances, different versions and/or configurations of the web browser that include the features disclosed herein are available for download from a server 130 and subsequent installation depending on whether the client 130 is a mobile device or non-mobile device. The web browser, once installed on a client 130, is configured to load web pages from any one or multiple client servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 130, is configured to privately store browsing session information on a client 130 in non-volatile memory using encryption, with the encryption key stored in volatile memory. During the web browsing session, the stored, encrypted browsing session information in the non-volatile memory is accessible using the encryption key in volatile memory. When the web browser is closed by a user on the client 130, thereby ending the web browsing session, both the encrypted browsing information and the encryption key are deleted. In certain aspects, if the web browser is unexpectedly closed (e.g., due to an error on the client 110 ending or "killing" the web browser as a background process), then the encryption key in volatile memory is lost (e.g., becomes inaccessible), thereby making the encrypted browsing information in non-volatile memory inaccessible. The next time the web browser is run, the web browser deletes any old encrypted browsing information in non-volatile memory. In certain other aspects (e.g., where the user configures the web browser to survive an unexpected closing), the encryption key is stored in a volatile memory storage facility that is configured to sustain the key in the event that the web browser is unexpectedly closed, such that if the user reopens the web browser, the encryption key is recovered to return the web browser to the state it was in before it unexpectedly closed.

Figure 2:
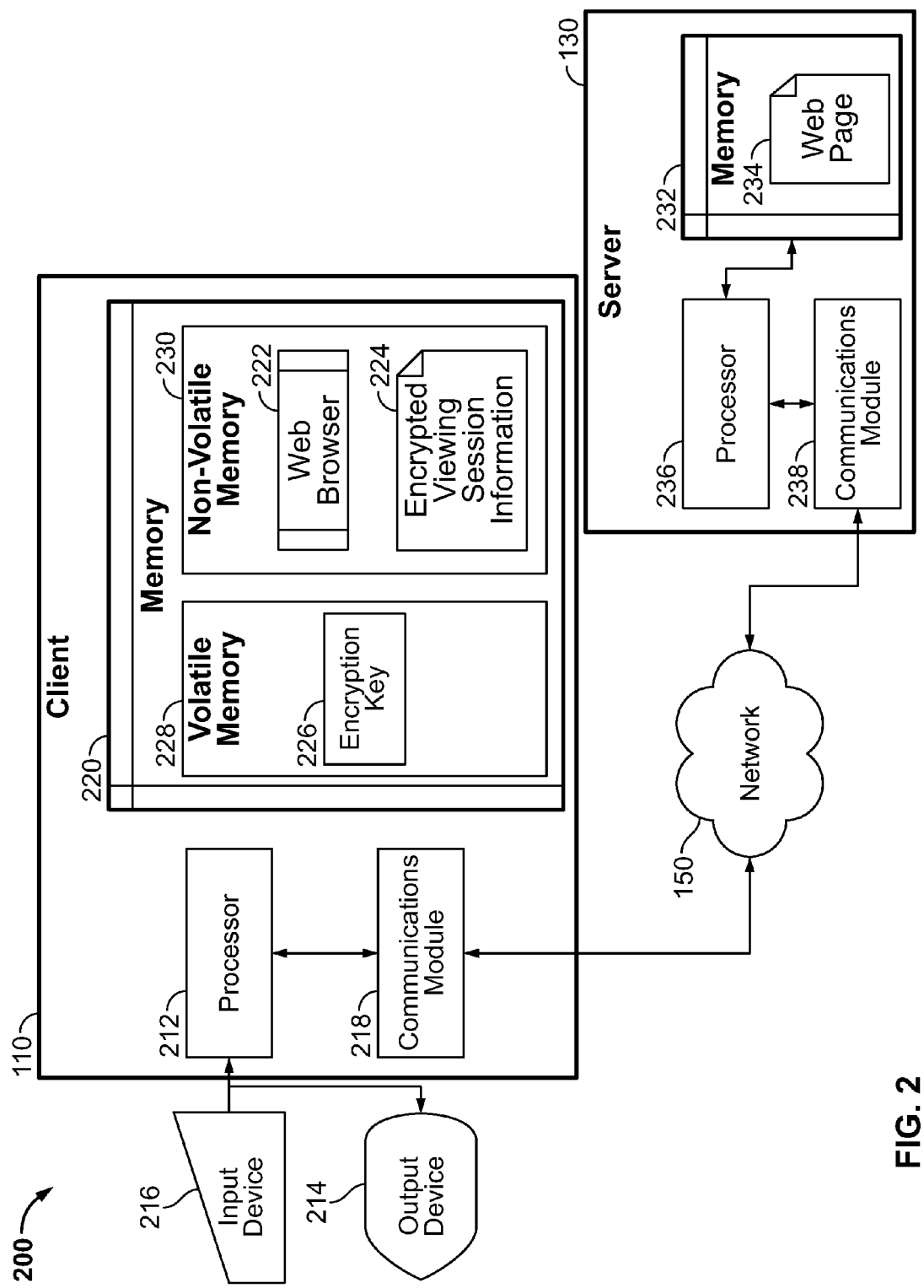
FIG. 2 is a block diagram illustrating the exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 is divided into volatile memory 228 (e.g., random access memory) and non-volatile memory 230 (e.g., flash memory, hard drive, etc.). As will be discussed in further detail below, the non-volatile memory 230 includes a web browser 222 and encrypted viewing session information 224 from the web browser 222, and the volatile memory 228 includes an encryption key 226 for accessing the encrypted viewing session information 224. The client 110 also includes an input device 216, such as a keyboard, touchscreen, or mouse, to receive user requests to the web browser (e.g., to enter a private browsing mode or to download web pages).

The processor 212 of the client 110 is configured to execute instructions, such as instructions physically coded into the processor 212, instructions received from software in memory 240, or a combination of both. For example, the processor 212 of the client 110 executes instructions from the web browser 222 to receive a request to temporarily store viewing session information for a web browsing session (e.g., in the web browser 222). The request can be received from a user during a web browsing session within the web browser 222 by the user selecting, using input device 216, an option to begin either a private web browsing session as opposed to a regular web browsing session. During a regular web browsing session, persistently stored viewing session information (e.g., browsing history, images, videos, text, and cookies) for web pages is stored in non-volatile memory 230. On the other hand, during a private web browsing session, browsing history, images, videos and text are encrypted and temporarily stored in the non-volatile memory 230 in the stored viewing session information 224, with the storage of cookies disabled. For example, the viewing session information 224 can include data associated with a web page 224 downloaded to the client 110 from a sever 130, and web page navigation history. Specifically, the client 110 sends a request to download the web page 224 from the client's communications module 218, over the network 150, to the communications module 238 of the server 130. The processor 236 of the server 130 provides a copy of the web page 224 from memory 232 to the client 110 in response to the request, and the client 110 stores data associated with the web page 224 as part of the viewing session information 224.

The processor 212 generates an encryption key 226 for the viewing session information for the web page during the web browsing session, which is used by the processor 212 to encrypt the viewing session information 224 for the web page and control access to the encrypted viewing session information 224. In certain aspects, the encryption key 226 is generated before a web page is loaded, and the encryption key can be unique to each viewing session (e.g., each instance of the web browser 222 running on the client 110).

A unique encryption key 226 can also be generated for each web page viewing window (e.g., indicated by a tab indicator) within the web browser 222, with corresponding encrypted viewing session information 224 stored for each web page viewing window. The encryption key 226 can be generated before the request to view the web page is received, and in response to the request to temporarily store viewing session information. The encryption key 226 may not be provided to the user.

The processor 212 stores the encrypted viewing session information 224 in the non-volatile memory 230 and the encryption key 226 in the volatile memory 228, separately from any persistently stored viewing session information. When the viewing session is completed by a user, the encrypted viewing session information 224 is deleted from the non-volatile memory 230, and the encryption key 226 automatically becomes in accessible because, for example, the pointer to the encryption key 226 present with the web browser 222 is lost. The encryption key 226 may also be deleted from the non-volatile memory 230 by the processor 212. If, however, the viewing session ends unexpectedly (e.g., due to an error in the web browser 222 or otherwise on the client 110), the encrypted viewing session information 224 becomes inaccessible because the pointer to the encryption key 226 present with the web browser 222 is lost. The processor 212 deletes the encrypted viewing session information 224 in non-volatile memory 230 (and any other previous encrypted viewing session information 224) when the web browser 224 is next run on the client 110.

Figure 3:
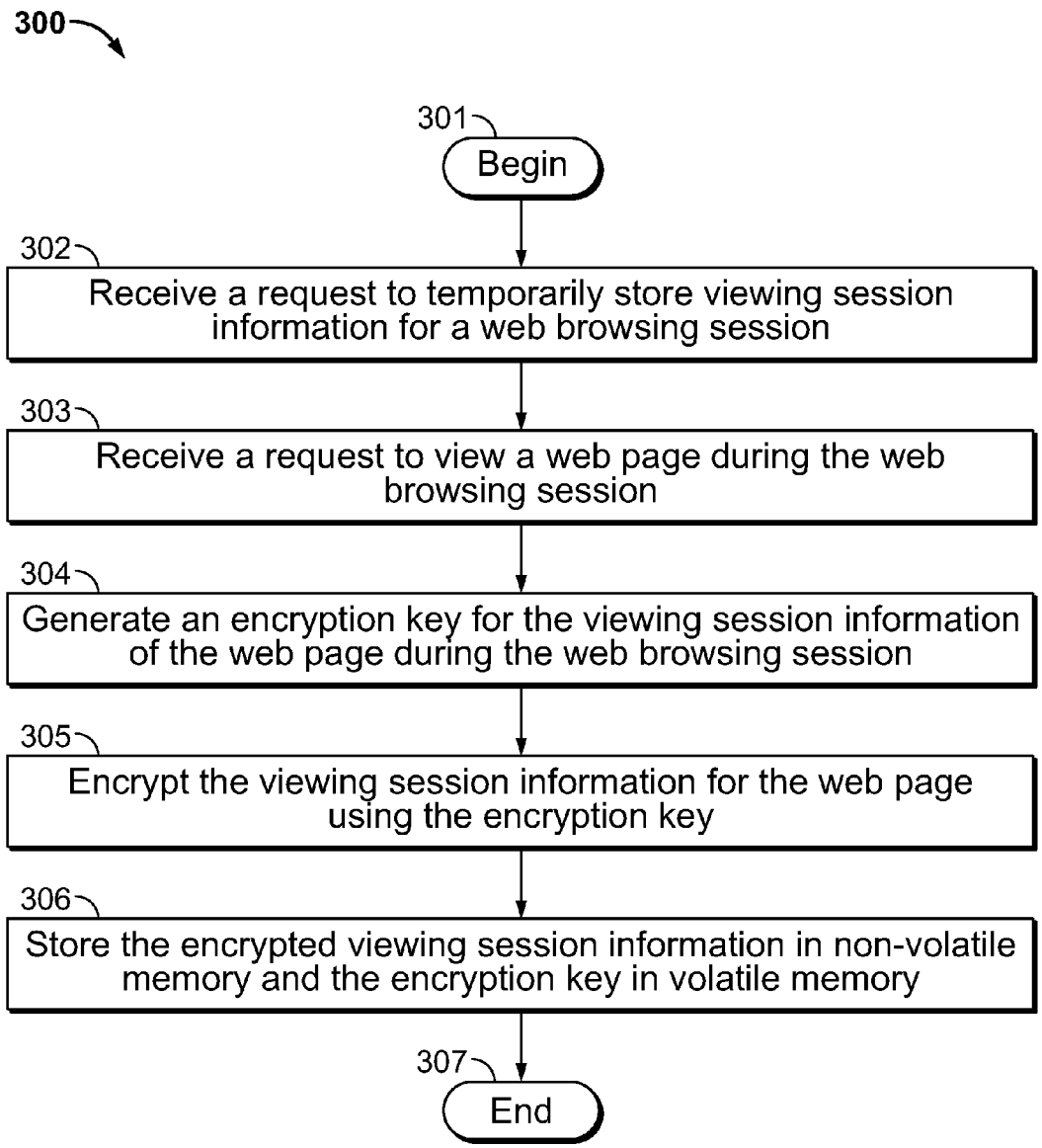
FIG. 3 illustrates an exemplary process for temporarily storing history of a private web browsing session using encryption using an exemplary client of FIG. 2.

FIG. 3 illustrates an exemplary process 300 for storing history of a private web browsing session using encryption using the exemplary client 110 of FIG. 2. The process 300 begins by proceeding from step 301 when an instance of a web browser 222 is run to step 302 when a request to temporarily store viewing session information for a web browsing session (e.g., in the web browser 222) is received. In step 303, a request to view a web page 234 during the web browsing session is received, and in step 304 an encryption key 226 is generated for the viewing session information for the web page 234 during the web browsing session. In step 305, the viewing session information for the web page is encrypted using the encryption key 226, and in step 306 the encrypted viewing session information 224 is stored in non-volatile memory 230 and the encryption key 226 is stored in volatile memory 228.

FIG. 3 set forth an exemplary process 300 for storing history of a private web browsing session using encryption using the exemplary client 110 of FIG. 2. An example will now be described using the exemplary process 300 of FIG. 3 and a smartphone as the exemplary client 110.

Figure 4A:
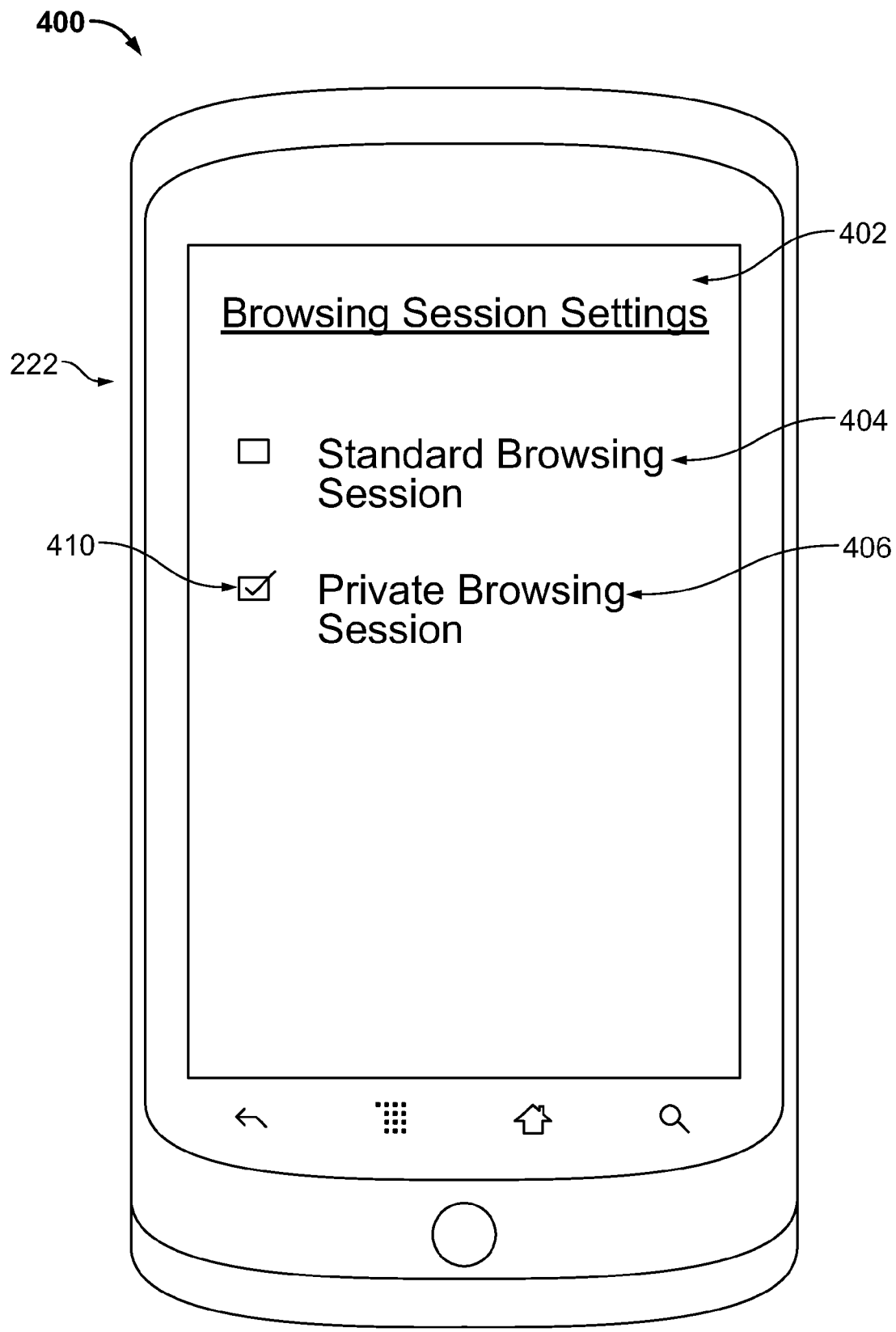
FIGS. 4A and 4B are exemplary screenshots associated with the exemplary process of FIG. 3.

The process 300 begins by proceeding from step 301 when a user opens a web browser 222 on the smartphone 110 to step 302 in which the web browser 222 displays a settings interface on an output device 214 in which the user can select between conducting a standard browsing session or a private browsing session. FIG. 4A is an exemplary screenshot 400 of a settings interface 402 in which the user is provided the options of selecting a standard browsing session 404 or a private browsing session 406, and in which the user has selected 410 to conduct a private browsing session.

Figure 4B:
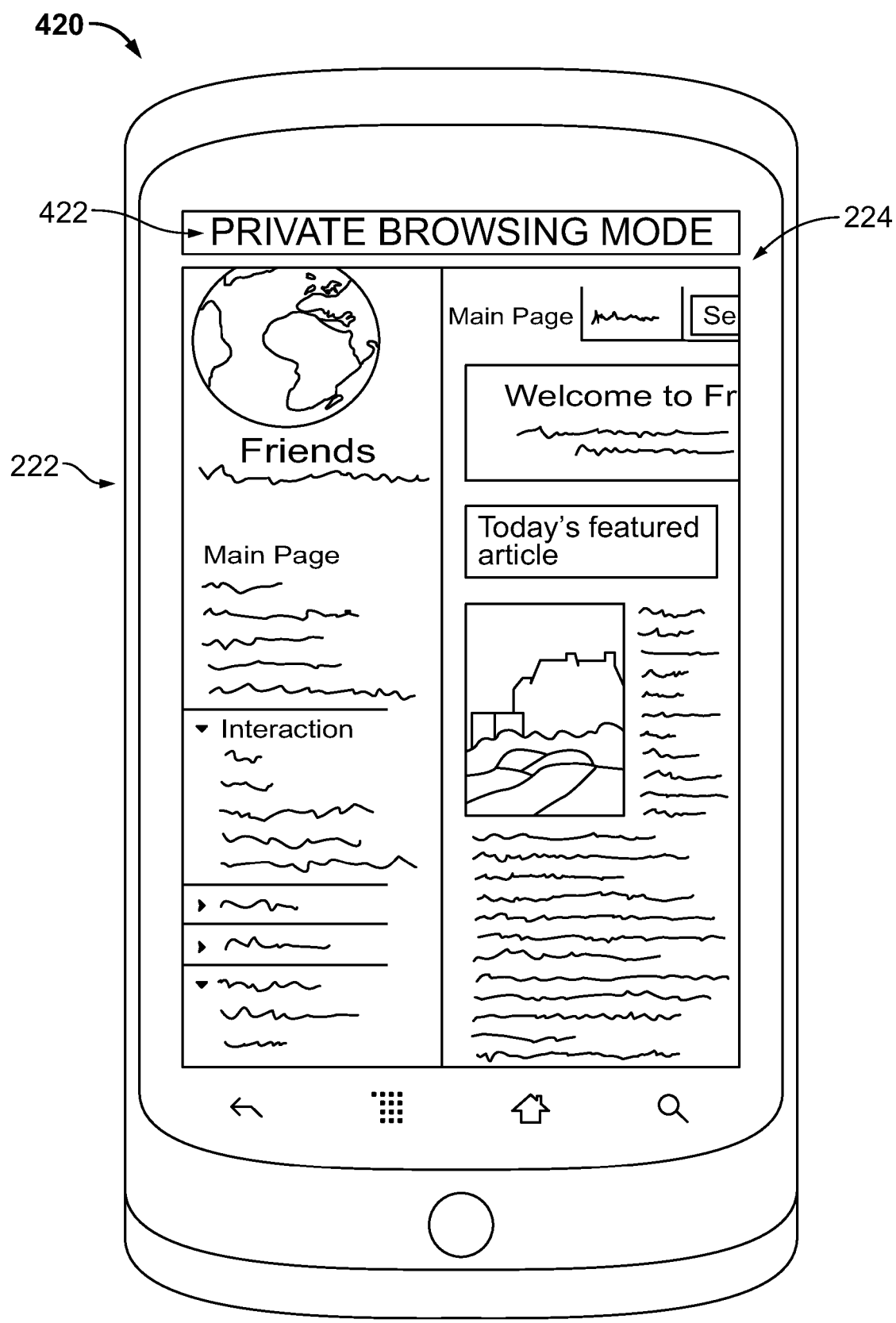

In step 303, after the user has selected to conduct a private browsing session, a request to view a web page 234 during the web browsing session is received from the user, and in step 304 an encryption key 226 is generated for the viewing session information for the web page during the web browsing session. In step 305, the viewing session information for the web page is encrypted using the encryption key 226. In step 306, the encrypted viewing session information 224 is stored in non-volatile memory 230 and the encryption key 226 is stored in volatile memory 228. FIG. 4B illustrates an exemplary screenshot 420 of the web page 224 displayed in a web browsing interface in the web browser 222 to the user on the smartphone 110 after the associated viewing session information 224 has been encrypted using the encryption key 226. The web browsing interface includes an indicator 422 that indicates the user is conducting a private browsing session.

Figure 5:
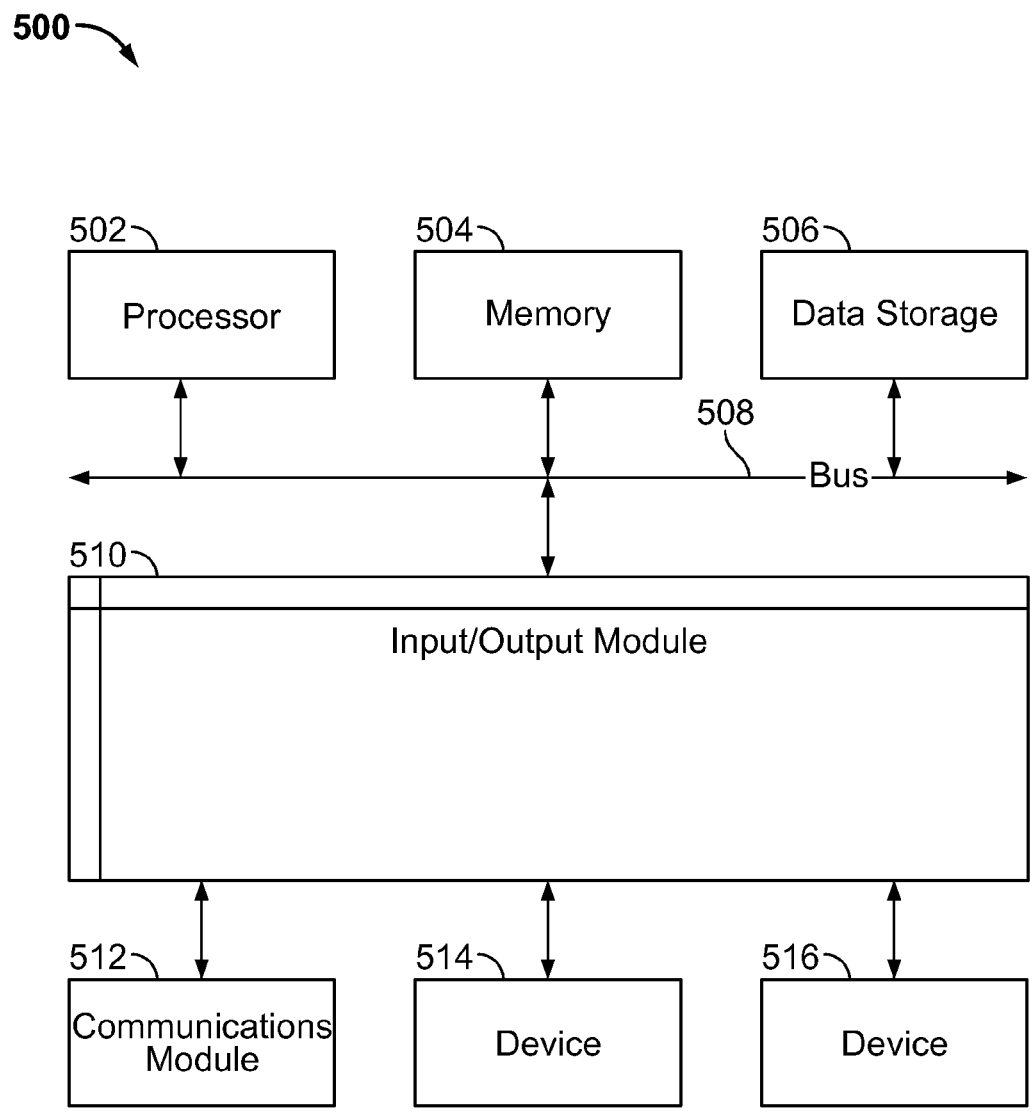
FIG. 5 is a block diagram illustrating an exemplary computer system with which the clients and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for temporarily storing history of a private web browsing session using encryption, the method comprising:
   receiving a request to temporarily store viewing session information for a web browsing session on a device;
   receiving a request on the device to view a web page during the web browsing session;
   generating an encryption key for the viewing session information for the web page during the web browsing session;
   encrypting the viewing session information for the web page using the encryption key;
   storing the encrypted viewing session information in non-volatile memory of the device and the encryption key in volatile memory of the device; and
   when the viewing session is completed by a user, deleting the encrypted viewing session information from the non-volatile memory,
   wherein access to the encrypted viewing session information is controlled by the encryption key in volatile memory.

2. The computer-implemented method of claim 1, wherein the encryption key is generated before the request to view the web page is received.

3. The computer-implemented method of claim 1, wherein the encryption key is generated in response to the request to temporarily store viewing session information.

4. The computer-implemented method of claim 1, wherein the temporarily stored viewing session information for the web page is stored separately from persistently stored viewing session information for another web page.

5. The computer-implemented method of claim 1, wherein the encryption key is unique to each viewing session.

6. The computer-implemented method of claim 1, wherein the request to temporarily store viewing session information is received from the user.

7. The computer-implemented method of claim 6, wherein the encryption key is not provided to the user.

8. A system for temporarily storing history of a private web browsing session using encryption, the system comprising:
   a volatile memory comprising an encryption key; and
   a processor configured to:
      receive a request to temporarily store viewing session information for a web browsing session on a device;
      receive a request on the device to view a web page during the web browsing session;
      generate an encryption key for the viewing session information for the web page during the web browsing session in response to the request to temporarily store viewing session information;
      encrypt the viewing session information for the web page using the encryption key;
      store the encrypted viewing session information in non-volatile memory of the device and the encryption key in volatile memory, of the device; and
      when the viewing session is completed by a user, delete the encrypted viewing session information from the non-volatile memory,
   wherein access to the encrypted viewing session information is controlled by the encryption key in volatile memory.

9. The system of claim 8, wherein the processor is configured to generate the encryption key before the request to view the web page is received.

10. The system of claim 8, wherein the processor is configured to store the temporarily stored viewing session information for the web page separately from persistently stored viewing session information for another web page.

11. The system of claim 8, wherein the processor is configured to generate an encryption key that is unique to each viewing session.

12. The system of claim 8, wherein the request to temporarily store viewing session information is received from the user.

13. The system of claim 12, wherein the encryption key is not provided to the user.

14. A mobile device web browser for temporarily storing history of a private web browsing session using encryption, the web browser comprising:
   a processor; and
   a memory comprising:
      a settings interface configured to receive, using the processor, a request to temporarily store viewing session information for a web browsing session on a device; and a web browsing interface configured to receive a request on the device to view the web page during the web browsing session, wherein the viewing session information for the web page is encrypted using an encryption key generated for the encrypted viewing session information, the encrypted viewing session information is stored in non-volatile memory of the device and the encryption key in volatile memory, of the device, access to the encrypted viewing session information is controlled by the encryption key, and when the viewing session is completed by a user, the encrypted viewing session information is deleted from the non-volatile memory.

15. The mobile device of claim 14, wherein the encryption key is generated before the request to view the web page is received.

16. The mobile device of claim 14, wherein the encryption key is generated in response to the request to temporarily store viewing session information.

17. A non-transitory machine-readable storage medium comprising machine-readable instructions for causing a processor to execute a method for temporarily storing history of a private web browsing session using encryption, the method comprising:

receiving a request from a user to temporarily store viewing session information for a web browsing session on a device;

receiving a request on the device to view a web page during the web browsing session;

generating an encryption key for the viewing session information for the web page during the web browsing session in response to the request to temporarily store viewing session information;

encrypting the viewing session information for the web page using the encryption key;

storing the encrypted viewing session information in non-volatile memory of the device and the encryption key in volatile memory of the device, and when the viewing session is completed by a user, deleting the encrypted viewing session information from the non-volatile memory, wherein access to the encrypted viewing session information is controlled by the encryption key in volatile memory.

* * * * *